A. C. BRIGGS.
LEAD-IN FOR FISH POUNDS.
APPLICATION FILED MAR. 20, 1911.
1,082,998.  Patented Dec. 30, 1913.
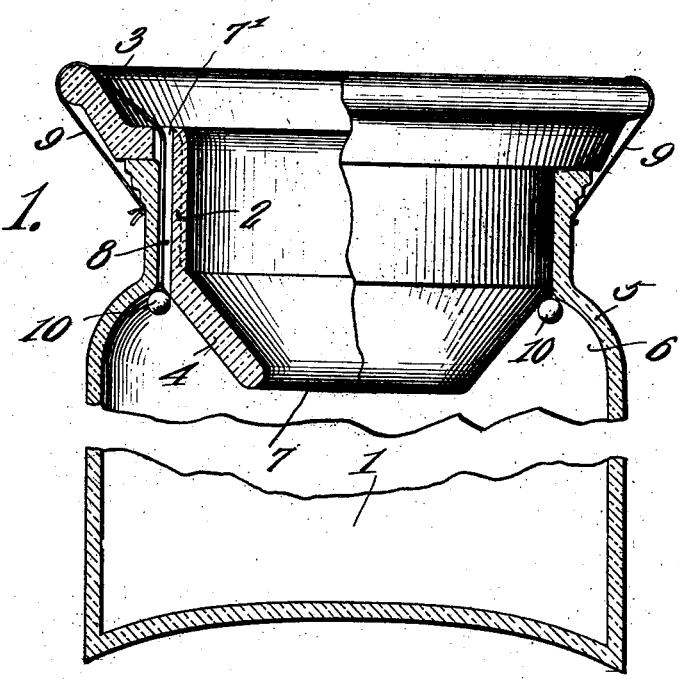
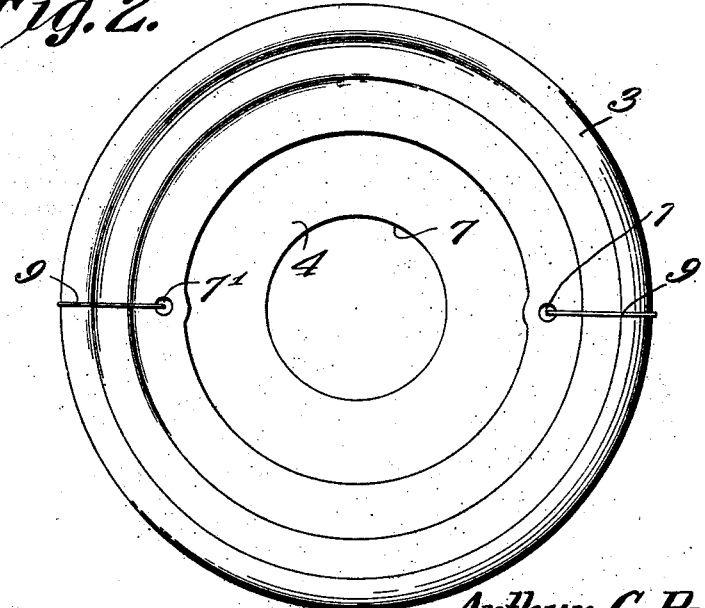
Arthur C. Briggs,
Inventor,
Witnesses:
by C. A. Snow & Co.
Attorneys.

UNITED STATES PATENT OFFICE.

ARTHUR C. BRIGGS, OF DETROIT, MICHIGAN.

LEAD-IN FOR FISH-POUNDS.

1,082,998.

Specification of Letters Patent. Patented Dec. 30, 1913.

Application filed March 20, 1911. Serial No. 615,630.

*To all whom it may concern:*

Be it known that I, ARTHUR C. BRIGGS, a citizen of the United States, residing at Detroit, in the county of Wayne and State of Michigan, have invented a new and useful Lead-In for Fish-Pounds, of which the following is a specification.

This invention relates to a lead-in for fish pounds.

The object of the invention is to provide a detachable lead-in to be used in connection with pounds adapted more particularly for catching live fish, that shall be simple of construction, and adapted to be connected with any glass or other suitable receptacle, the lead-in being of such configuration as to present no obstruction to the entrance of the fish, but to be effective when attached to a pound in preventing their escape.

With the above and other objects in view, as will appear as the nature of the invention is better understood, the same consists in the novel construction and arrangement of parts of a detachable lead-in for fish pounds, as will hereinafter be fully described and claimed.

In the accompanying drawing forming a part of this specification, and in which like characters of reference indicate corresponding parts,—Figure 1 is a view in side elevation, partly in section, of a portion of a pound showing combined therewith a lead-in embodying the improvements of the present invention. Fig. 2 is a top plan view.

The lead-in is attached to a pound 1 which is made of glass or other suitable material, and may be an ordinary Mason fruit jar, or any other receptacle suited to the purpose and having a mouth of sufficient size to receive the lead-in, presently to be described. The pound is intended to lie on its side upon the bed of the body of water where the fish are to be caught, and will contain a suitable bait as usual.

The detachable lead-in, which forms the subject matter of the present invention, may be constructed from transparent glass, celluloid, or other material, and comprises a straight cylindrical neck 2, a flaring mouth 3 to rest upon the edge of the mouth of the pound, and a funnel throat 4, the structure being made of a strength that will enable it to withstand comparatively rough usage without danger of breakage. The throat projects within the pound a distance sufficient to form in conjunction with the walls of the shoulder 5 an effective cul-de-sac 6 of which the only outlet is the throat opening 7. Now, as is well known, entrapped fish invariably seek the highest level of the trap confining them in their effort to escape, and as the pound to which this lead-in is attached, will, as stated, lie on its side, it follows that the fish will seek the upper wall thereof, and this being above the plane of the throat opening, there will be practically no danger of any of the fish escaping, for as soon as they enter the cul-de-sac and encounter the throat 4 and shoulder 5, they will immediately turn and seek escape in the other direction, and repeat these attempts indefinitely.

The lead-in may be held combined with a pound in any preferred manner, that herein shown consisting in providing the mouth with two diametrically disposed orifices 7' that communicate with and constitute continuations of longitudinal grooves 8 formed in the exterior of the neck and that extend preferably throughout its length. These grooves and orifices are engaged by cords or tapes 9, one end of each of which has secured to it a stop 10 in the nature of a ball of cork, lead or any other suitable material, and these two stops are of a diameter sufficiently greater than the grooves to prevent passage thereinto when the lead-in is in position. As shown in Fig. 1, the cords are drawn over the edge of the mouth and are passed one or more times around the mouth of the pound, and their ends are tied together, thus holding the lead-in and pound securely assembled.

While it will generally be preferred to employ the flexible fastening means, such as described, for holding the lead-in assembled with a jar or the like, still there may be circumstances where the use of the cords or the like could not be resorted to as in the event of their becoming broken or lost, and it is to enable the operator still to hold the lead-in combined with the jar that the straight cylindrical neck 2 is provided, so that if cords or the like are not obtainable, by looping any flexible material, such as paper, cloth, leather, or the like, around the neck to provide a gasket, or by the provision of a gasket, the lead-in may be held firmly in position. This function, as will be obvious, could not be secured if the lead-in were of funnel shape throughout.

The lead-in forming this invention is, as a whole, exceedingly simple in construction, and will be found of the highest efficiency and utility in use, and by reason of its peculiar construction, is well adapted to jars or other pounds that may readily be obtained, so that breakage of the latter will only cause temporary inconvenience.

What is claimed is:—

1. A lead-in for fish pounds comprising in a rigid transparent structure, a neck provided with a plurality of channels, a flaring mouth having openings communicating with the channels, and a funnel throat, and flexible attaching members passing through the openings and within the channels and provided with terminal stops.

2. A fish trap comprising a transparent pound closed at one end and open at the other, and a lead-in therefor comprising a cylindrical neck to fit within the open end, and provided with a plurality of channels, a flaring mouth having openings communicating with the channels, and a funnel throat, and flexible attaching members passing through the openings and within the channels and having terminal stops co-acting with the walls of the pound and the throat to prevent withdrawal in one direction.

3. The combination with a bottle fish pound, of a lead-in comprising a frusto-conical throat, a cylindrical neck with external channels, a flaring mouth at the outer extremity of said cylindrical neck adapted to contact with the end walls of the fish pound, and means fitting within the said neck channels for securing the lead-in to the said fish pound.

In testimony that I claim the foregoing as my own, I have hereto affixed my signature in the presence of two witnesses.

ARTHUR C. BRIGGS.

Witnesses:
 EDWARD N. PAGELSEN,
 ELIZABETH M. BROWN.